United States Patent
Paxman et al.

(10) Patent No.: US 11,835,923 B2
(45) Date of Patent: Dec. 5, 2023

(54) IMAGING THROUGH SCATTERING MEDIA

(71) Applicant: RADIANT GEOSPATIAL SOLUTIONS LLC, Wilmington, DE (US)

(72) Inventors: Richard G Paxman, Saline, MI (US); David A. Carrara, Dexter, MI (US)

(73) Assignee: MAXAR MISSION SOLUTIONS INC., Westminster, CO (US)

( * ) Notice: Subject to any disclaimer, the term of this patent is extended or adjusted under 35 U.S.C. 154(b) by 426 days.

(21) Appl. No.: 17/092,181

(22) Filed: Nov. 6, 2020

(65) Prior Publication Data
US 2022/0146982 A1 May 12, 2022

(51) Int. Cl.
*G03H 1/08* (2006.01)
*G03H 1/00* (2006.01)

(52) U.S. Cl.
CPC ......... *G03H 1/0866* (2013.01); *G03H 1/0005* (2013.01); *G03H 2222/12* (2013.01); *G03H 2240/54* (2013.01)

(58) Field of Classification Search
CPC .... G03H 1/0866; G03H 1/0005; G03H 1/265; G03H 2222/12; G03H 2240/54; G03H 2001/0083; G03H 2001/0445; G03H 2001/0452; G03H 2210/63; G03H 1/0443; G01N 21/453; G01N 21/4795
USPC ........................................................... 359/9
See application file for complete search history.

(56) References Cited

U.S. PATENT DOCUMENTS

| 5,371,368 | A | * | 12/1994 | Alfano | A61B 5/4312 250/341.1 |
| 5,384,455 | A | * | 1/1995 | Paxman | G01J 9/00 356/121 |
| 5,796,498 | A | * | 8/1998 | French | G03H 1/04 359/24 |

(Continued)

OTHER PUBLICATIONS

Labeyrie, A., "Attainment of Diffraction Limited Resolution in Large Telescopes by Fourier Analysing Speckle Patterns in Star Images", Astronomy and Astrophysics, Vol. 6, p. 85 (May 1970)

(Continued)

*Primary Examiner* — Jade R Chwasz
*Assistant Examiner* — Jyotsna V Dabbi
(74) *Attorney, Agent, or Firm* — Nixon & Vanderhye, PC

(57) ABSTRACT

Example embodiments provide digital holographic techniques and associated systems for imaging through scattering media in a strictly one-sided observation in which the observer (e.g. the controller of the camera) has no access to the object plane nor does the observer introduce a fluorescing agent to the object plane. An example imaging system comprises a laser source, a digital sensor array, and a processing system. The processing system transmits light from the laser source to a target object; detects interference formed on the digital sensor array by a reference beam from the transmitted light and reflected light from the target object, the reflected light either travelling through or being reflected by a scattering medium located between the target object and the digital sensor array; jointly estimating, based on the detected interference, parameters defining the scattering behavior of the particular scattering medium and an image of the target object; and outputting the jointly estimated scattering parameters and an image of the target object.

24 Claims, 12 Drawing Sheets

(56) References Cited

U.S. PATENT DOCUMENTS

2008/0137933 A1* 6/2008 Kim ............... G01B 9/021
382/131
2018/0275254 A1* 9/2018 Wu ............... G01S 7/4816

OTHER PUBLICATIONS

Paxman, R.G., "Evaluation of Phase-Diversity Techniques for Solar-Image Restoration", Astrophysical Journal v. 466, p. 1087, Aug. 1996.

Seldin et al., Multi-frame Satellite-image Reconstruction Using Adaptive-Optics Compensation, Signal Recover and Synthesis, OSA Technical Digest Series 11, 11-13 (Jun. 1998).

Thelen et al., "Overcoming Turbulence-induced Space-Variant Blur by Using Phase-diverse speckle," JOSA A 26(1), 206-218 (2009).

Vellekoop et al., "Focusing Coherent Light Through Opaque Strongly Scattering Media", Optics Letters 32(16), 2309-2311 (2007).

Stockbridge et al., "Focusing through Dynamic Scattering Media", Opt. Express 20(14), 15086-15092 (2012).

Bertolotti et al., "Non-invasive Imaging Through Opaque Scattering Layers", Nature 491 (7423), 232-234 (2012).

Katz et al., "Non-invasive Single-shot Imaging Through Scattering Layers and Around Corners via Speckle Correlations", Nat. Photonics 8(10), 784-790 (2014).

Popoff et al., "Measuring the Transmission Matrix in Optics:An Approach to the Study and Control of Light Propagation in Disordered Media", Phys. Rev. Lett. 104(10), 100601 (2010).

Muller et al., "Real-time Correction of Atmospherically Degraded Telescope Images Through Image Sharpening", J. Opt. Soc. Am. 64(9), 1200-1210 (1974).

Paxman et al., "Optimal Simulation of Volume Turbulence With Phase Screens", Proc. SPIE 3763-01, 2-10 (1999).

Paxman et al., "Spatial Stabilization of Deep-Turbulence-Induced Anisoplanatic Blue", Optics Express 24(25), 29109-29125 (2016).

Beenakker, C.W.J., "Random-matrix theory of quantum transport", Rev. Mod. Phys. 69(3), 731-808 (1997).

\* cited by examiner 3 of many light paths
through a distribution
of thin diffusers object

IMAGING THROUGH SCATTERING MEDIA

TECHNICAL FIELD

This application relates to imaging through scattering (turbid) media.

BACKGROUND

Since the pioneering contributions of Labeyrie (see, e.g., A. Labeyrie, "*Attainment of diffraction-limited resolution in large telescopes by Fourier analyzing speckle patterns in star images*," Astron. Astrophys. 6(1), 85-87 (1970)) in 1970, researchers have made tremendous strides in imaging through turbulent media (e.g., the atmosphere) for applications involving astronomy (see e.g., R. G. Paxman, et al., "*Evaluation of phase-diversity techniques for solar-image restoration*," The Astrophysical Journal 466, 1087 (1996)), ground-based imaging of satellites (J. H. Seldin, R. G. Paxman, B. L. Ellerbroek, and J. Riker, "*Multi-frame satellite-image reconstruction using adaptive-optics compensation*," in Signal Recovery and Synthesis, OSA Technical Digest Series 11, 11-13 (June, 1998)), and imaging extended scenes (e.g. human faces) in horizontal-path geometries (see e.g., B. J. Thelen, R. G. Paxman, D. A. Carrara, and J. H. Seldin, "*Overcoming turbulence-induced space-variant blur by using phase-diverse speckle*," JOSA A 26(1), 206-218 (2009)).

Imaging through turbid (scattering) media (e.g., clouds, fog, smoke, tree canopies, biological tissue, etc.) is a much more challenging problem than imaging through turbulent media. Historically, most researchers attacking the scattering problem have assumed that scattered light is so randomized that it carries little or no information. Their approach has been to try to retrieve the weak unscattered signal in the presence of the dominant and confounding scattered signal.

Recently researchers have demonstrated imaging through thin diffusers by actually utilizing the scattered radiation, illustrating that scattered radiation also carries information. These demonstrations rely on access to the object behind the diffuser to characterize the diffuser response (see e.g., I. M. Vellekoop and A. P. Mosk, "*Focusing coherent light through opaque strongly scattering media*," Optics letters 32(16), 2309-2311 (2007) and C. Stockbridge, Y. Lu, J. Moore, S. Hoffman, R. Paxman, K. Toussaint, and T. Bifano, "*Focusing through dynamic scattering media*," Opt. Express 20(14), 15086-15092 (2012)). This access is, of course, impractical in the vast majority of applications.

Alternatively, one-sided imaging through a thin diffuser has been accomplished by ensuring that the object to be imaged is infused with a non-endogenous fluorescing agent (see e.g., J. Bertolotti, et al., "*Non-invasive imaging through opaque scattering layers*," Nature 491(7423), 232-234 (2012) and O. Katz, P. Heidmann, M. Fink, and S. Gigan, "*Non-invasive single-shot imaging through scattering layers and around corners via speckle correlations*," Nat. Photonics 8(10), 784-790 (2014)). However, infusing objects to be imaged is also a significant limitation in most practical applications.

Therefore, improved systems and techniques for image acquisition through scattering media are still desired.

SUMMARY OF EXAMPLE EMBODIMENTS

Certain embodiments overcome the deficiencies in the state-of-the-art described above by providing a digital holographic technique and associated system for imaging through scattering media in a strictly one-sided observation. In the strictly one-sided observation, the observer (e.g. the controller of the camera) has no access to the object plane nor does the observer introduce a fluorescing agent to the object plane. This represents a significant advance to the state-of-the-art.

Certain embodiments may be configured, for example, to be used in remote-sensing applications impeded by intervening scattering media such as, for example, clouds, fog, smoke, aerosols, tree canopies, or material coverings such as, for example, tarps or tents. Such remote-sensing applications may provide for target detection, identification, and tracking in the presence of scattering obscurants. Certain embodiments may be configured to be used in biological imaging applications to scan through biological tissue. For example, some embodiments provide for imaging into human tissue using non-ionizing radiation, such as laser light, obviating the dose limitations associated with x-rays. Other example applications of certain embodiments may include non-line-of-sight imaging applications, and applications that improve reception for signals in the presence of multipath effects. According to one embodiment an imaging system comprises a laser source, a digital sensor array, and a processing system. The processing system transmits light from the laser source to a target object; detects interference formed on the digital sensor array by a reference beam from the transmitted light and reflected light from the target object, the reflected light either travelling through or being reflected by a scattering medium located between the target object and the digital sensor array; jointly estimates, based on the detected interference, the parameters defining the scattering behavior of the particular scattering medium and an image of the target object; and outputs the jointly estimated scattering parameters and an image of the target object.

According to an embodiment an imaging method is performed by a processing system. The method includes: controlling a laser light source to transmit light to a target object; detecting interference formed on a digital sensor array by a reference beam from the transmitted light and reflected light from the target object, the reflected light either travelling through or being reflected by a scattering medium located between the target object and the digital sensor array; jointly estimating, based on the detected interference, the parameters defining the scattering behavior of the particular scattering medium and an image of the target object; and outputting the jointly estimated scattering parameters and an image of the target object.

According to an embodiment, a non-transitory computer readable storage medium storing instructions which, when executed by a processing system including at least one processor, causes the processing system to perform: controlling a laser light source to transmit light to a target object; detecting interference formed on a digital sensor array by a reference beam from the transmitted light and reflected light from the target object, the reflected light either travelling through or being reflected by a scattering medium located between the target object and the digital sensor array; jointly estimating, based on the detected interference, the parameters defining the scattering behavior of the particular scattering medium and an image of the target object; and outputting the jointly estimated scattering parameters and an image of the target object.

BRIEF DESCRIPTION OF THE DRAWINGS

Certain features, aspects and advantages of the embodiments described herein will be better understood from the following detailed description, including the appended drawings, in which.

DETAILED DESCRIPTION OF CERTAIN EXEMPLARY EMBODIMENTS

Example embodiments of the present invention provide for digital-holographic techniques and associated systems for imaging through scattering (turbid) media in a strictly one-sided observation. The techniques for strictly one-sided imaging in example embodiments involve digital-holography collection followed by estimation of the un-aberrated object by maximizing a performance metric such as, for example, a generalized sharpness metric.

Figure 1:
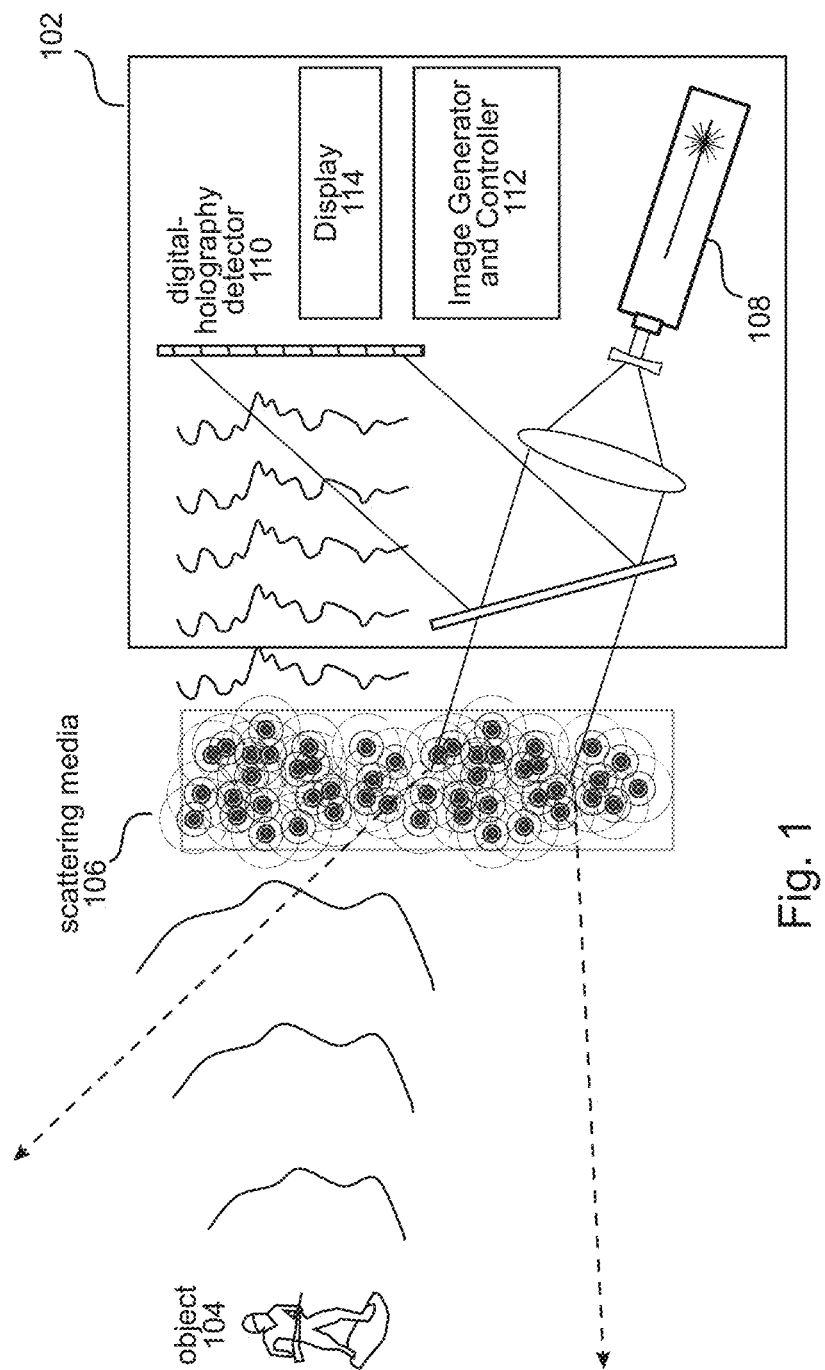
FIG. 1 schematically illustrates an imaging system for imaging objects through a scattering medium, in accordance with some embodiments.

FIG. 1 schematically illustrates an imaging system for imaging objects through a scattering medium, in accordance with some embodiments. In the scenario 100 shown in FIG. 1, the imaging system 102 is configured to acquire an image of the target object 104 through a scattering medium 106.

The imaging system 102 operates to obtain one or more images of the target object with a good level of clarity even when the light from the target object travels through the scattering medium 106 before reaching the system 102 which detects the image. As described in the background section, imaging through a scattering medium is subject to more challenges than imaging through other conditions such as a turbulent medium, and the state-of-the-art in addressing the challenges in imaging through a scattering medium is not practical for many applications. System 102 provides for a strictly one-sided imaging technique through scattering media, thus offering a practical solution that can be used in many applications.

Figure 2:
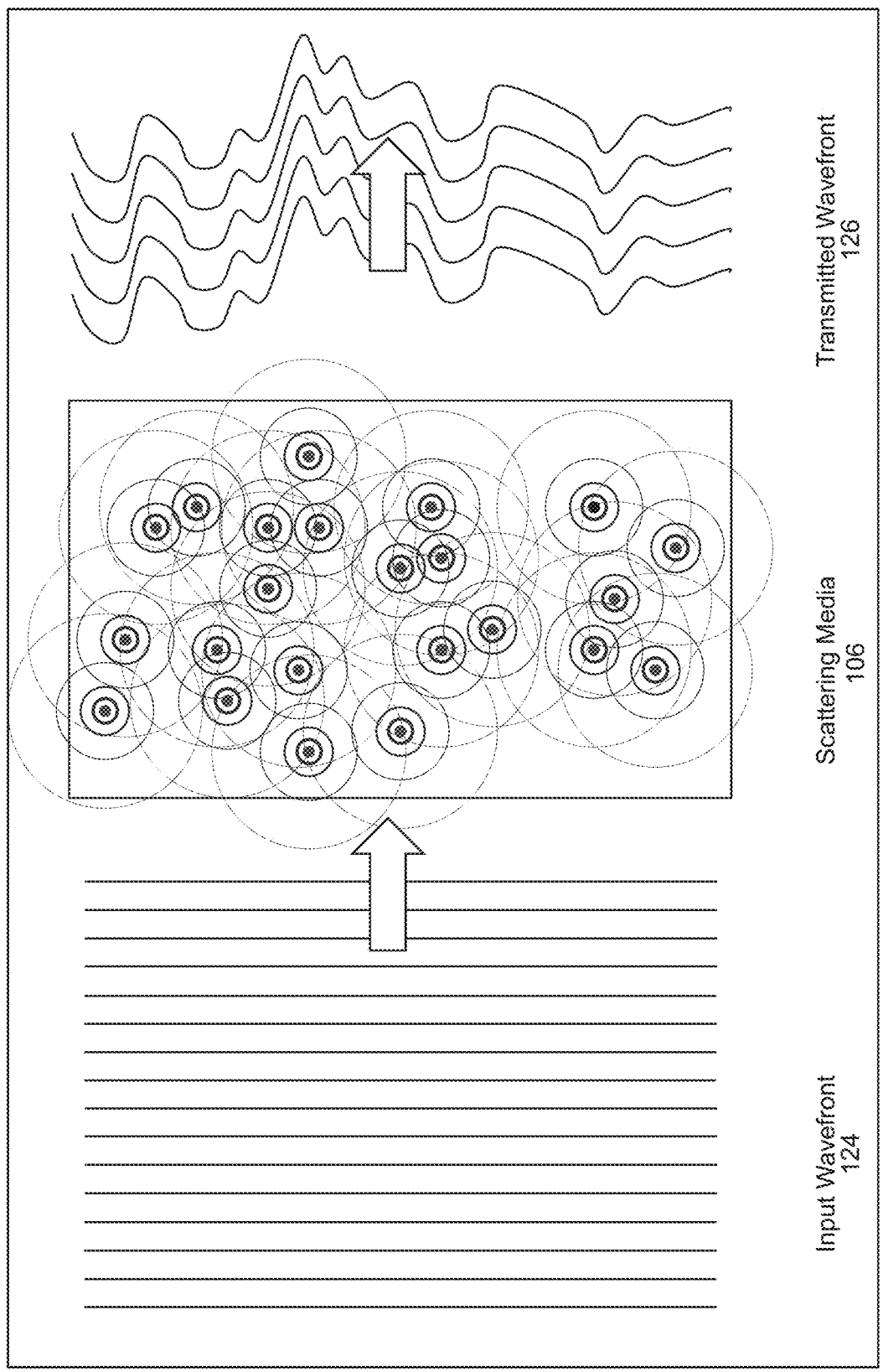
FIG. 2 schematically illustrates an effect of the scattering medium in FIG. 1 on the reflected light from the object.

FIG. 2 schematically illustrates an effect of a scattering medium on a plane wave of light, locally randomizing the uniform directionality of the incoming plane wave. The scattering medium 106 in FIG. 1 will have a similar randomizing effect on the reflected light from the target object 104. Scattering media are sometimes referred to as a turbid media, and have an effect on light that travels through it that is different than the effect imposed by turbulent media, such as, for example, the atmosphere, on light that travels through it. The size and/or character of the light-perturbing components are different in the two types of media relative to the wavelength of the light. In turbid media, the light-perturbing or scattering components are smaller, or are of similar size, relative to the wavelength of the propagating light. Additionally or alternatively, scattering components in turbid media have sharp discontinuities in the refractive index compared to the wavelength of the propagating light. In contrast, in turbulent media, the wavelength of the propagating light is much smaller than the distance over which the refractive index changes. (*"Progress in Optics"*. Netherlands, Elsevier Science, 1971). For example, visible light travelling through the atmosphere is subject to index of refraction variations due to atmospheric turbulence. The scale of these index variations is much larger than the wavelength of light, and the interaction of the light with the turbulence is governed by geometric optics. The rays of light are perturbed by the turbulence, but they remain rays. However, if visible light encounters turbid media, such as paper or biological tissue, then the scale of the scattering elements is smaller than a wavelength of light. Single rays are not maintained, but instead scattering occurs in many directions. Scattering media 106 includes, but is not limited to, clouds, fog, smoke, tree canopies, tents, tarps, and biological tissue. As schematically illustrated in FIG. 2, the light waveforms 124, reflected from the target object and arriving at the scattering medium are subjected to random variations in the scattering medium such that the transmitted waveform 126 exiting the scattering medium is substantially randomly disturbed compared to the input waveform. Example embodiments provide for forming a mesoscopic model of the scattering media and for using the model to estimate the incoherent object. In contrast to conventional techniques that only rely on ballistic (un-scattered) light to determine the object, example embodiments may additionally utilize the scattered light based on the inventors understanding that even the scattered light is deterministic relative to a specific scatter medium and that a model of the specific scattering medium and the incoherent object can be jointly estimated.

The target object 104 can be any object. The size of the objects that can be imaged with sufficient clarity may be different in the respective applications and/or embodiments. The size of the objects that can be imaged with sufficient clarity may depend on the characteristics of the illuminating light, characteristics of the scattering media, and/or the distance from the target object to a detector of the system 102.

The system 102 includes a light source 108 to illuminate the target object 104, an image detection plane 110 and a processing system 112 to process the image data obtained from the detection plane 110. The processing system 112 may also control the positioning and/or operation of the light source 108 and the detection plane 110. In some embodiments, a display 114 may be connected to processing system 112 to display the image detected on the detection plane 110 and processed by the processing system 112.

The light source 108, according to some embodiments, is a coherent light source such as, for example, a laser. The wavelength and power of the laser light source is not limited in example embodiments, and is only limited by the specific application. In some embodiments, the light source 108 includes a continuous wave (CW) laser or a pulsed laser source. The wavelength of the laser is not limited by embodiments and is only limited in the particular applications. In some embodiments, the light source 108 may be any coherent source, such as, for example, X-ray lasers, visible or InfraRed lasers, masers, etc. The wavelength of the laser source may be controlled in accordance with a type of the scattering medium, a type of the target object, and/or an estimated distance between the target object and the scattering medium. In some embodiments, the wavelength may be controlled in accordance with the target object such that a surface of the target object is rough relative to the wavelength of coherent light by which it will be illuminated.

The detector plane 110, according to some embodiments, includes a digital sensor array such as, for example, a CCD camera, to record the interference of reflected light from the target object and a reference beam from the light source. The image represented in the interference data is called a hologram. The detector plane needs to be able to detect the holographic fringe patterns at the laser wavelength. Thus, the pixel pitch needs to be sufficiently fine to resolve the fringes (e.g. holographic fringe patterns), which depends on wavelength and geometry. In some embodiments, the pixel pitch of the detector plane is configurable in accordance with the wavelength, geometry and/or other aspects. Known digital-holography techniques can be used to infer the complex field at the detector plane. The size of the array and/or the size of the pixels in the array are not limited in embodiments, and are only limited in the particular applications. In the description below, the detector plane 110 may be referred to as the focal plane. Other detector arrays that could be used include, but are not limited to, CMOS arrays, Quantum Image Sensor (QIS) arrays, and Avalanche Photo-Diode (APD) arrays.

The processing system 112 may include one or more processors configured to receive the signal data received at the detector plane and to process the signal data to detect images of the target object 104. The signal data include interference data from the digital sensor array, the interference data corresponding to the interference between the light from the light source 108 after being reflected from the target object, and a reference beam from the light source. In example embodiments, the processing system 112 jointly estimates both the image of the target object and the influence of the scattering media 106 based on the received signal data.

In some embodiments, the processing system 112 also controls the light source 108 and/or the detector plane 110 during the acquisition of interference data from the detector plane 110. Control of the light source may include controlling the light source or an optical arrangement to change the illumination of the target object. Multiple object speckle realizations can be collected by scanning the illumination from light source 108 to illuminate the target object from respectively different positions and/or angles. A hologram can then be collected for each object speckle realization. Processing typically will involve the use of multiple holograms, each corresponding to a separate object speckle realization, to jointly estimate the influence of the diffuser (the diffuser model) and an image of the object. The processing system 112 may display one or more holograms and/or the estimated incoherent object on a display such as display 114. The display 114 and/or input devices (not shown in FIG. 1) connected to the processing system 112 may be used in configuring the system 102.

Figure 3:
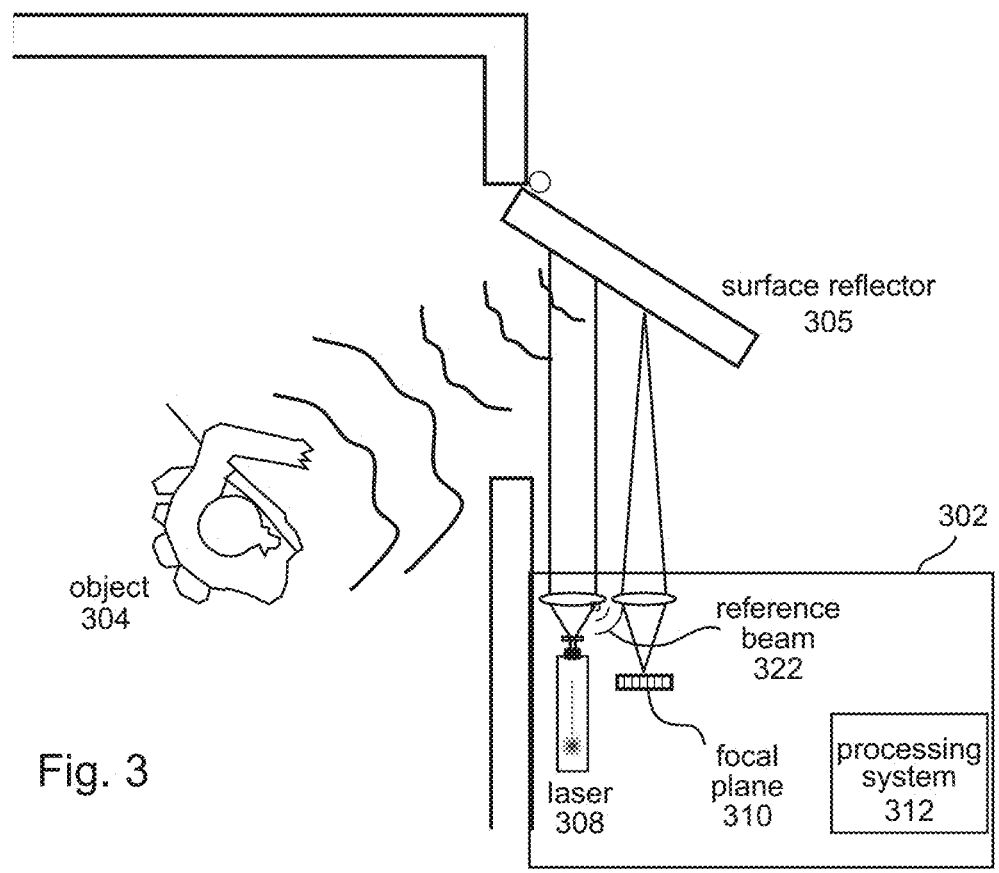
FIG. 3 schematically illustrates an imaging system according to some embodiments, in a non-line-of-sight application.

FIG. 3 schematically illustrates an imaging system according to some embodiments, in a non-line-of-sight (NLOS) application. Some embodiments recognize that NLOS imaging by reflection is mathematically equivalent to imaging by transmission through a thin diffuser.

The NLOS embodiments may be used for imaging around a corner, as shown in FIG. 3. The imaging system 302 does not have line-of-sight to target object 304, which is behind a wall from the system 302. However, system 302 can acquire an image of the target object 304 by reflection off of a surface reflector 305, such as, for example, a door, a wall, a frosted window, or the like. The surface reflector in many instances behaves with similar characteristics to a scattering medium such as the scattering medium 106. The illumination light from the light source 308 of the system 302 and the reflected light from the target object 304 are spatially segregated on the scattering surface 305. The reflected light from the surface reflector 305 is interfered with a reference beam 322 from the light source 308 in order to form a hologram on a detector (e.g. digital sensor array) at the focal plane 310. The processing system 312 receives the interference data from the detector 310 and generates an image of the target object in a process such as, for example, that is described in FIGS. 7 and 8.

With respect to the model used for the scattering medium in the processing involved in the system 302 (described below in relation to FIGS. 7 and 8) the reflective surface in the NLOS application can be modeled as a single thin scatterer, analogous to a thin diffuser in the case of transmission. Because, to a good approximation, there is little or no multiple scattering that happens in many reflective surfaces in NLOS applications, modeling a single thin scatterer yields satisfactory results. For some reflecting surfaces, modeling a thick (volume) scatterer may be required.

In the NLOS application too, multiple object speckle realizations can be collected by scanning the illumination from light source 308 to illuminate the target object from respectively different positions and/or angles.

Figure 4A:
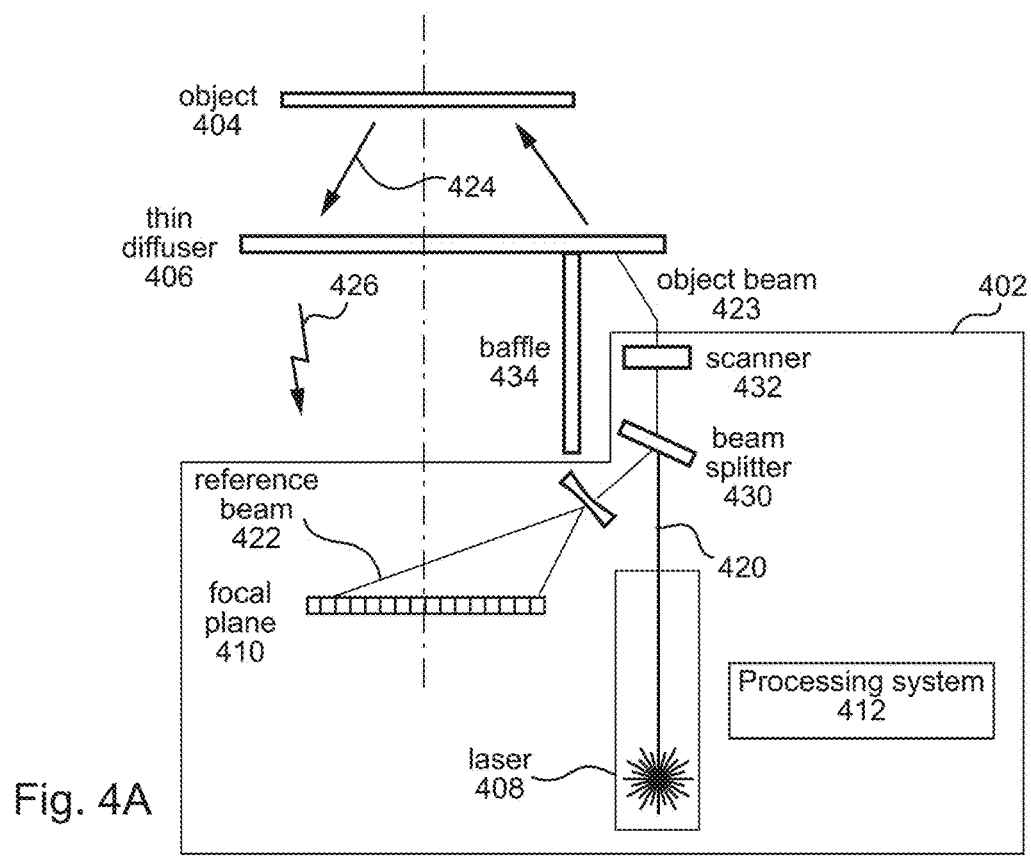
FIG. 4A and FIG. 4B illustrate a laboratory setup of an example system, according to some embodiments.
Figure 4B:
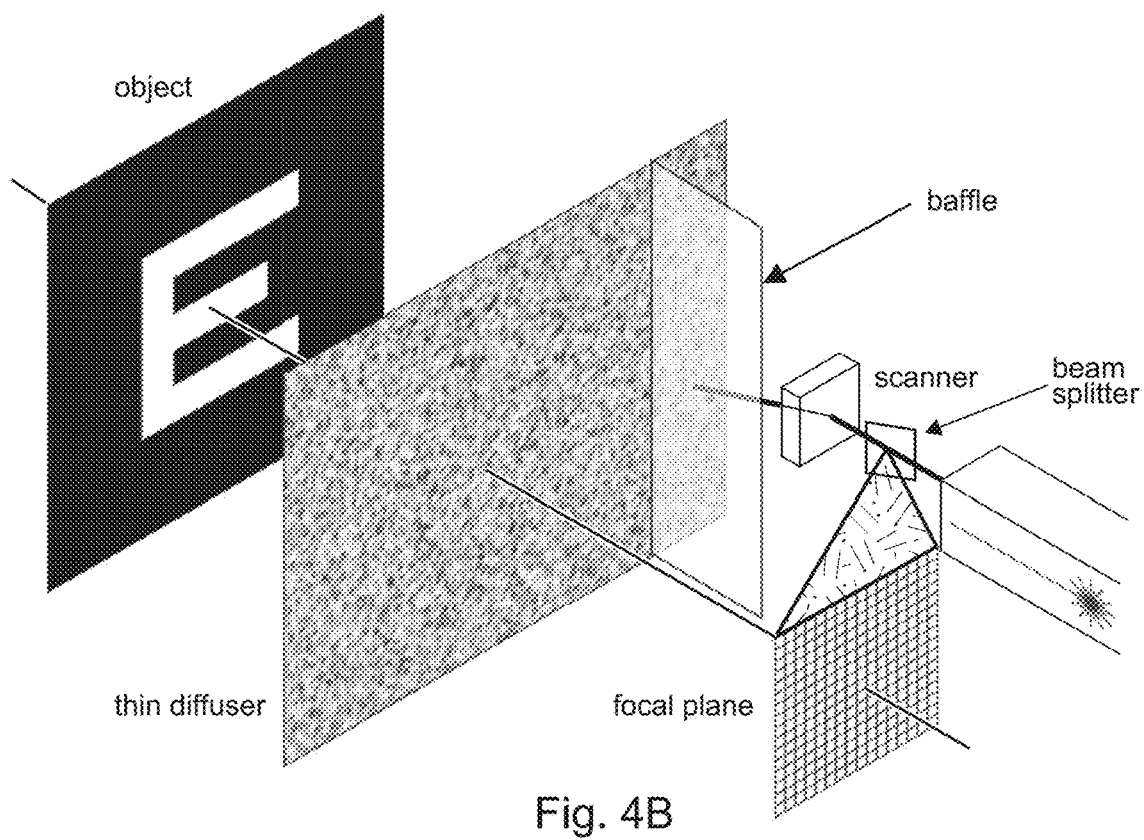

FIG. 4A illustrates a laboratory setup including an example system 402, according to some embodiments. The system 402 provides for one-sided imaging of a target object 404 through a thin diffuser 406. This is a fundamental milestone in achieving imaging through thick scattering media. FIG. 4B shows another view of the laboratory setup.

Consider the top-view schematic diagram in FIG. 4A, which depicts imaging a planar object 404 (and can readily be adapted to a 3D object) that is obscured by a thin diffuser. In some embodiments, the target object 404 is a non-fluorescing endogenous object. The object 404 can be a general gray-scale extended scene or an extended binary scene, as shown in FIG. 4B. It is illuminated by directing a laser beam 420 through the diffuser 406. Coherent light 424 is reflected off of the object 404 back toward the diffuser 406. Some of this reflected light 424 transmits through the diffuser 406 but is confounded by the scattering imposed by the diffuser 406. The transmitted light 426 exiting the diffuser 406 propagates to a focal plane 410 where it is interfered with a reference beam 422 (picked off from the laser illumination 420) and detected by a digital detector array. Using holographic processing, the complex field at the focal plane can be retrieved from the interference data detected by the digital detector at the focal plane 410. Note that a scanner 432, controlled by the processing system, may allow the illuminating of the target object 404 from differing vantage points, providing respectively different object speckle realizations. Note also that the focal plane may also be referred to in this document as the detector plane, detector array or focal plane array. Processing system 412 operates in a similar manner to the processing systems 112 and 312 to receive the interference data and determine the image of the target object and the influence of the diffuser and also to control the light source and/or the digital sensor array.

The inventors recognized that the interference data from the interference of the reference beam from the laser light source and the reflected light travelling through the scattering medium can be used to determine an image of the target object by a certain process. Algorithmically, an inverse problem is constructed and the collected data are inverted to estimate the target object. To do this, a forward model is established that allows the calculation of the expected data when both the target object and the influence of the scattering medium (the scattering model for the specific medium) are known.

Modeling microscopic scattering interactions may become overwhelming and impractical in many real scenarios. Therefore, in some embodiments, the inventors utilize a mesoscopic model that effectively captures the specific influence or scattering behavior for a particular diffuser.

The transmission matrix has been proposed as a parametrically efficient mesoscopic scattering model in the study of light propagation in disordered media (see e.g. S. M. Popoff, G. Lerosey, R. Carminati, M. Fink, A. C. Boccara, and S. Gigan, "*Measuring the transmission matrix in optics: An approach to the study and control of light propagation in disordered media,*" Phys. Rev. Lett. 104(10), 100601 (2010)). Accordingly, the transmission matrix efficiently models the influence of scattering media on propagating light. The transmission matrix for the special case of a thin diffuser is a diagonal matrix. Therefore, the number of parameters required to characterize the scattering imposed by a thin diffuser is relatively small.

With the mesoscopic model in place, an inverse problem can be formulated: given the detected interferometric (holographic) data collected in the focal plane for each of multiple object speckle realizations, jointly estimate the transmission-matrix parameters and the incoherent object (e.g. the spatial distribution of the intensity of the light reflected by the object under hypothetical incoherent illumination in the absence of a diffuser).

There are multiple ways to solve this inverse problem. In one embodiment, an initial stage in the inversion is accomplished when the complex field at the focal plane for each object speckle realization is determined from standard holographic-processing methods. The principle of maximum sharpness is used in some embodiments to perform this joint estimation of the transmission matrix parameters and the incoherent object from the computed complex field values. Sharpness has been previously used in real-time correction of turbulence-induced phase aberrations in astronomy (see e.g., R. A. Muller and A. Buffington, "*Real-time correction of atmospherically degraded telescope images through image sharpening,*" J. Opt. Soc. Am. 64(9), 1200-1210 (1974)), where objects are well modeled as spatially incoherent sources. The first use, known to the inventors, of sharpness for coherent-imaging applications is found in R. G. Paxman and J. C. Marron, "*Aberration correction of speckled imagery with an image-sharpness criterion,*" Proc. SPIE 976, 37-47 (1988). The sharpness of an estimated object is readily found by taking the pixel-wise intensity to a power and then integrating spatially, $S_\beta(\hat{I}(x)) = \Sigma_x \hat{I}^\beta(x)$, where $\hat{I}$ is the estimated incoherent object, $\beta$ is a convenient exponent (often $\beta=2$), and x is a 2D multi-index (indexing a 2D pixel array in a discrete formulation). The intuition here is that an object estimate is sharpest (maximizing the sharpness metric) when the estimates have the proper compensation for aberrations or scattering. When multiple object-speckle realizations are available, the incoherent object estimate is formed by standard speckle averaging. The generalized sharpness is simply the sharpness associated with an object estimate formed by multiple object-speckle realizations.

Figure 5:
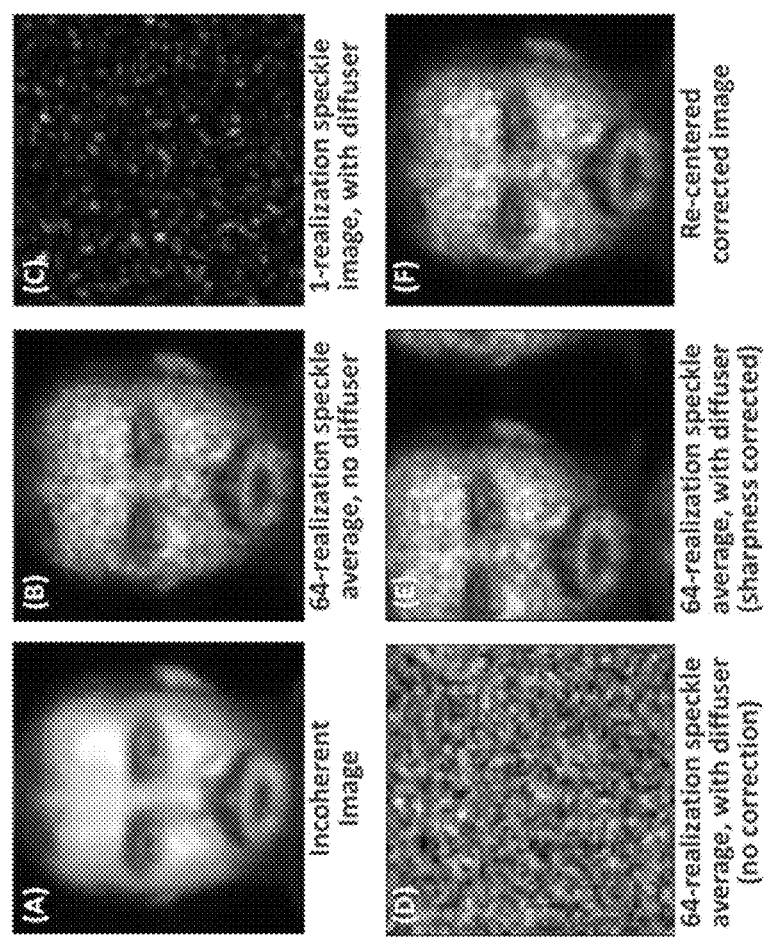
FIG. 5 shows simulated example results of imaging through scattering media, in accordance with some embodiments.

FIG. 5 shows results of a simulation based on the arrangement of FIG. 4 and under the assumptions that the object is illuminated with a plane wave and that we are able to retrieve from the data noiseless estimates of the complex field at the surface of the diffuser on the opposite side of the object. The simulation began by considering imaging without the diffuser. The incoherent image of the gray-scale object is shown in FIG. 5 image A. Using this same object, its illumination by the laser is simulated, and the speckle averaged image over 64 speckle realizations in the absence of any diffuser is determined (FIG. 5 image B). This image has a residual speckle texture, characteristic of coherent-imaging modalities such as ultrasound and synthetic-aperture radar (SAR), even after modest speckle averaging. If more speckle realizations were to be added, FIG. 5 image B would converge to FIG. 5 image A.

The reflection of the laser light from the object is also simulated, which then propagates through the diffuser and on to the focal plane. The complex field in the focal plane can be retrieved using standard holographic processing. This was done for 64 different complex-object speckle realizations, obtained by varying the illumination aspect. It was then assumed that the complex field can be back propagated to the location of the diffuser plane to achieve a noiseless version of the complex field there. If a single realization of the diffuser-plane complex field is back-propagated to the object plane without diffuser compensation, then the unsatisfying speckle pattern shown in FIG. 5 image C is obtained. One might expect that speckle averaging over all 64 realizations might help to pull out some object features, but this expectation is not warranted, as shown in FIG. 5 image D.

However, if each realization is back-propagated while compensating for the scattering with a diffuser estimate obtained by maximizing the sharpness of the speckle-averaged object estimate, then the object estimate shown in FIG. 5 image E is retrieved, which provides significant target detail. Note that this image is shifted because sharpness is insensitive to image shifts. It is straightforward to center the retrieved image, as shown in FIG. 5 image F.

Careful comparison of FIG. 5 images B and F, shows they are nearly identical, reproducing even the same residual speckle detail. This surprising result means that, by using sharpness, one is able to estimate the diffuser and compensate for the scattering with sufficient fidelity so as to closely duplicate the object estimate as if there were no diffuser present at all. This is a key enabling feature for the embodiments described here.

This approach can be generalized to accommodate volume diffusers (that more accurately models scattering media such as clouds, fog, etc.) by considering a sequence of thin diffusers, in a manner similar to the use of distributed phase screens to model volume turbulence (see e.g., R. G. Paxman, B. J. Thelen, and J. J. Miller, "*Optimal simulation of volume turbulence with phase screens,*" in Proc. SPIE 3763-01, 2-10 (1999) and R. G. Paxman, T. J. Rogne, B. A. Sickmiller, D. A. LeMaster, J. J. Miller, and C. G. Vollweiler, "*Spatial stabilization of deep-turbulence-induced anisoplanatic blur,*" Optics Express 24(25), 29109-29125 (2016)). Whereas light propagates in one direction through distributed phase screens, the significant complication of multiple scattering arises with a sequence of thin diffusers. The inventors have selected a mathematical framework, originally developed to model the scattering of quantum particles (e.g., electrons) propagating through disordered media (see e.g., C. W. J. Beenakker, "*Random-matrix theory of quantum transport,*" Rev. Mod. Phys. 69(3), 731-808 (1997)), that can be adapted for use with a sequence of thin diffusers. This framework defines a "scattering matrix", which is a direct generalization of the transmission matrix but also includes reflection. In addition, a second matrix called the "transfer matrix", an equivalent characterization to the scattering matrix, greatly simplifies the computation of the terminal properties of a sequence of thin diffusers. The scattering matrix and transfer matrix are described later in relation to FIGS. 9A and 9B, respectively. Implementation of this mathematical framework in certain embodiments enables imaging through volume scattering.

Figure 6:
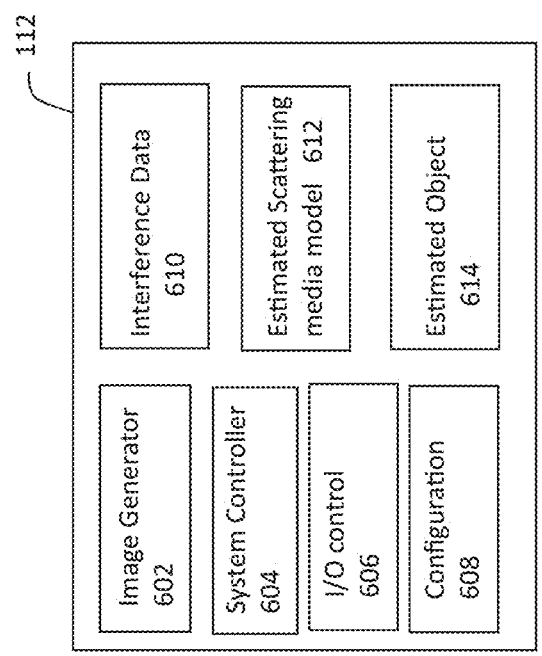
FIG. 6 is a block diagram illustration of certain modules of a processing system, according to some embodiments.

FIG. 6 is a block diagram showing program logic components of the processing system 112, according to some embodiments.

An image generator component 602 uses the interference data from the component 606 to generate an estimate of the target image. In some embodiments, the component 602 may include programming logic performing the processes 700 and 800. A system controller component 604 controls a light source, the digital sensor array, and an optical arrangement including a scanner.

An input/output controller component 606 controls the input and output of the processing system. The outputting of the estimated image of the target object to a display, storage and/or network location may be controlled by component 606. A configuration component 608 stores the configuration for the light source (e.g. power level, wavelength etc.), scanner (e.g. sequence of speckle realizations), and the digital sensor array. The configuration may be based on default values and/or user configuration.

An interference data collection 610 stores the interference data received from the digital sensor array. The interference is formed between a reference beam and the light reflected from the target object and travelling through a scattering media. An estimated scattering-media model 612 stores the mathematical model representing the estimated scattering media that is between the target object and the camera. An estimated object 614 stores the estimate of the target object that is formed based on the interference data.

Figure 7:
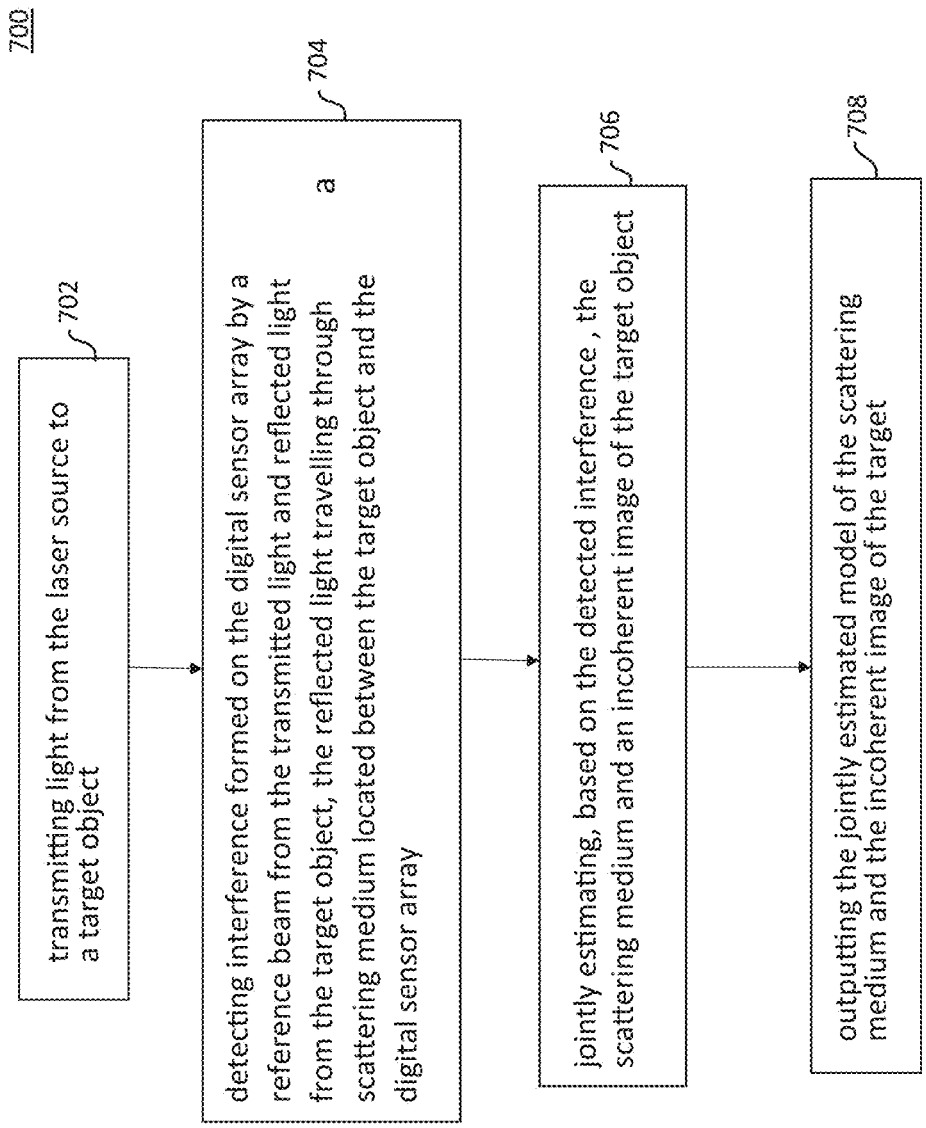
FIG. 7 is a flowchart of a process for imaging through scattering media, according to some embodiments.

FIG. 7 is a flowchart for a process 700 for imaging through scattering media, in accordance with some embodiments. Process 700 can be implemented in a system, such as the system 102 shown in FIG. 1 or the systems that control the light source, digital detector panel and process the intensity data collected at the detector panel in the implementations shown in FIGS. 3, 4A and 4B.

At operation 702, the target object 404 is illuminated by transmitting light from the light source 408 to the target object 404. The light source may be, for example, a laser. The light beam 420 transmitted from the light source is split by a beam splitter 430 into a reference beam 422 directed towards the digital detector array 410 at the focal plane and an illuminating beam 423 directed towards the target object 404. The illuminating beam 423 may further be controlled by a scanner 432 to change the position(s) and/or angle(s) at which it illuminates the target object 404. The changing of the position(s) and/or angle(s) of illumination may be used to iteratively acquire respectively different speckle instances of the target object. The illuminating beam 423 may travel through scattering media 406 before it illuminates the target object 404.

In some embodiments, a processing system controls the light source and the optical arrangement including the beam splitter and the scanner to illuminate the target object. In some embodiments, the data acquisition is controlled so that all the data for an image is acquired in a time short compared to the evolution of the scattering media. The above may be generalized to get 3D-object shape information with, for example, tunable laser and opacity constraint.

At operation 704, detecting interference patterns formed on the digital sensor array by a reference beam from the transmitted light and reflected light from the target object, the reflected light travelling through a scattering medium located between the target object and the digital sensor array.

The digital detector array records an interference pattern from which both the amplitude and phase (or complex field) of the wavefront of light can be computed. This is done by combining the wavefront of light from the target object with the coherent reference beam from the same light source to produce an interference pattern. The interference pattern is called a hologram. The digital data comprising the recorded interference patterns are then processed by the processing system.

The processing system performs further processing of the data to generate an image of the target object based on the recorded hologram. Further processing may include extracting phase and amplitude data from the digitized hologram and further processing that data to create an estimate of the target object and parameters of the diffuser.

At operation 706, jointly estimating, based on the detected digital hologram, the model of the scattering medium influence and an image of the target object. In this operation, the processing system, after an initial estimated image of the target object is obtained from the hologram, utilizes a performance metric to jointly estimate the target object and a model of the scattering medium by optimizing the performance metric of the estimated target object. In some embodiments, the performance metric is a sharpness metric, and the model of the scattering medium is a mesoscopic model. The transfer matrix is a candidate mesoscopic model. Other mesoscopic models may be utilized, including, for example, a volume distribution of scatterers.

A description of operation 706 according to an embodiment is provided below in relation to FIG. 8.

At operation 708, outputting the image of the target object jointly estimated with the model of the scattering medium. The image may be output to a display device (e.g. a 2D or 3D image of the target object displayed on a screen), printed to a printing device, the corresponding data can be stored on a digital storage device, and/or the corresponding data can be transmitted over a network connected to the processing system.

Figure 8:
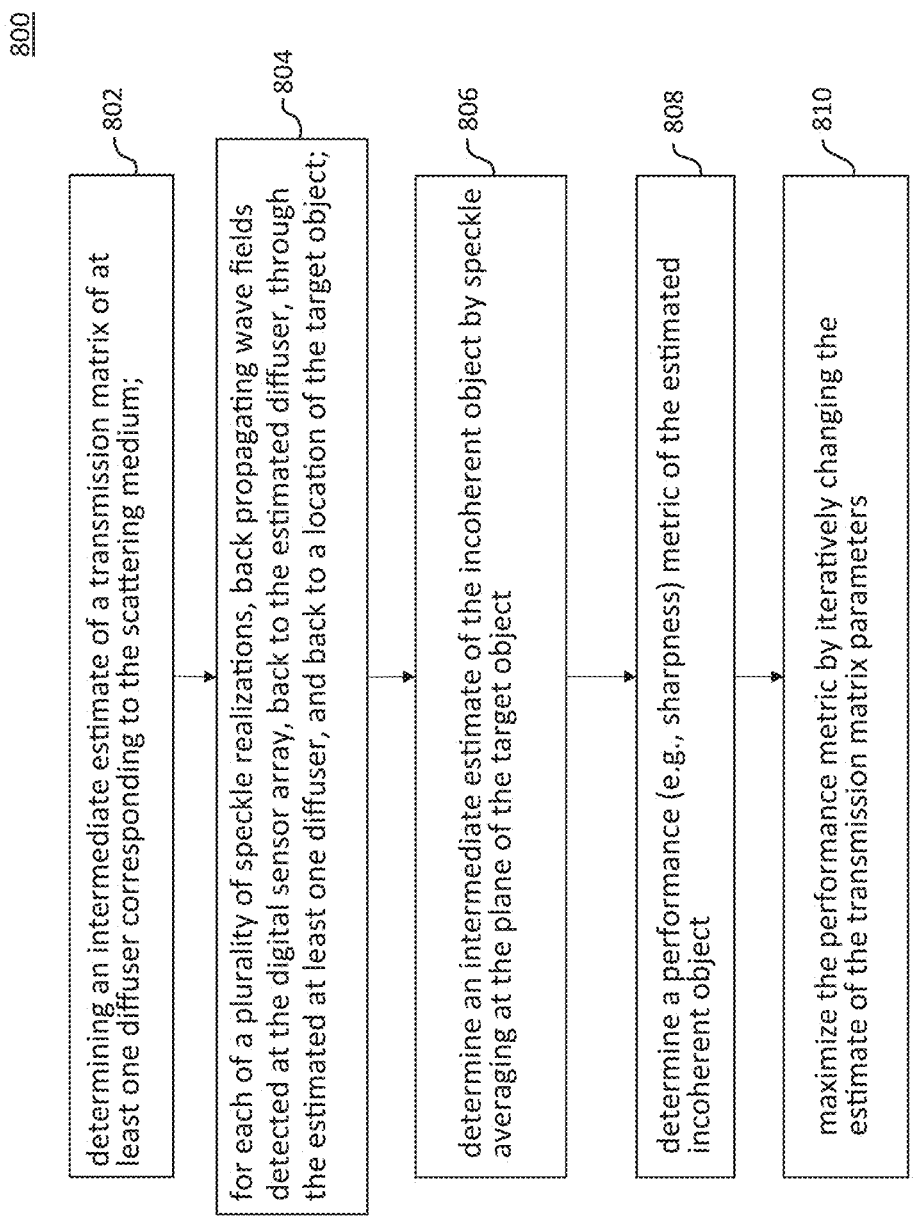
FIG. 8 is a flowchart for a process for the joint estimation of the scattering medium and the object performed in the process of FIG. 7, according to some embodiments.

FIG. 8 is a flowchart for a process 800 for the joint estimation of the scattering medium and the object performed at operation 706 in the process of FIG. 7, according to some embodiments.

At operation 802, determining an intermediate estimate of transmission-matrix parameters for at least one diffuser corresponding to the scattering medium. In some embodiments, the transmission matrix T is a candidate mesoscopic model for the scattering media.

$$E^{out} = TE^{in}$$

$$E_j^{out} = \sum_{k=1}^{K} t_{jk} E_k^{in}$$

$E^{in}$ and $E^{out}$ are complex field input/output vectors, and $t_{jk}$ represents complex elements of transmission matrix T. A large number of parameters may be required to process the mesoscopic model as a transmission matrix, e.g. for a 16×16 pixel image, K=256 and the number of complex elements in T is $256^2$. However, single-scattering geometries, such as, for example, transmission through a thin diffuser or reflection off of a single surface, yield a diagonal transmission matrix. The ability to consider a diagonal matrix (instead of a full matrix) for the mesoscopic scattering model significantly simplifies the estimation of the mesoscopic model. For example, for a 16×16 pixel image, K=256 and the number of complex elements in T is 256.

At operation 804, for each of a plurality of object speckle realizations, inverse propagating wave fields detected (holographically) at the digital sensor array, back to the estimated diffuser, then through the estimated at least one diffuser, and back to the location of the target object.

At the nth speckle realization, the complex field for the target object can be represented as, $$f_n^t(x) = \sqrt{I(x)} z_n(x),$$

where the superscript t indicates target plane, I(x) is the incoherent object, and $z_n(x)$ are stationary complex random variables with a form that depends on the illumination. For the special case of plane-wave illumination, $z_n(x)$ are uncorrelated circular complex random variables and are distributed as follows: $z_n(x) \sim N(0,0.5) + iN(0,0.5)$, where $N(\mu, \sigma^2)$ denotes a Normally-distributed random variable with mean $\mu$ and variance $\sigma^2$. The complex field before the thin diffuser (or single-surface reflector) can be represented as $$f_n^{d-}(x) = \mathcal{F}_{td}\{f_n^t(x)\},$$

where the superscript d− indicates just before the diffuser and $\mathcal{F}_{td}\{\bullet\}$ is an operator (such as a Fresnel operator) that propagates the complex field from the target to the diffuser.

The complex field for the nth speckle realization after the thin diffuser, that is, the aberrated complex field, can be represented as, $$f_n^{d+}(x) = f_n^{d-}(x) C_d(x),$$

where the superscript d+ indicates just after the diffuser and each pixel of the diffuser (assuming a fixed diffuser) is characterized by $C_d(x) \sim N(0,0.5) + iN(0,0.5)$ that doesn't change for differing object speckle realizations. The complex field for the nth object speckle realization at the holographic plane (or detector plane) is given by $$f_n^h(x) = \mathcal{F}_{dh}\{f_n^{d+}(x)\},$$

where the superscript h indicates the holographic (or detector) plane and $\mathcal{F}_{dh}\{\bullet\}$ is an operator (such as a Fresnel operator) that propagates the field from the diffuser to the holographic plane.

Given the estimated field at the holographic plane, $\hat{f}_n^h(x)$, (derived from holographic processing of the detected interferograms) for each of N object speckle realizations and an estimate of the diffuser parameters, $\hat{C}_d(x)$, common to all object speckle realizations, the estimated incoherent object at the location of the target plane can be represented as, $$\hat{I}_t(\hat{C}_d; x) = \frac{1}{N} \sum_{n=1}^{N} \left| \mathcal{F}_{td}^{-1}\left\{ \mathcal{F}_{dh}^{-1}\{\hat{f}_n^h(x)\} \frac{\hat{C}_d^*(x)}{|\hat{C}_d(x)|^2 + \epsilon} \right\} \right|^2,$$

where $\mathcal{F}_{ab}^{-1}\{\bullet\}$ is the inverse operator for the appropriate a→b plane-to-plane propagator, the asterisk represents complex conjugate, and E is a small number that prevents the denominator from going to zero.

At operation 806, determining an intermediate estimate of the incoherent object by speckle averaging at the plane of the target object. In some embodiments, the speckle averaging corresponds to averaging the intensity of the field across speckle realizations.

At operation 808, determine a performance metric of the estimated incoherent object.

An example performance metric is a generalized sharpness metric, represented as $$M_\beta(\hat{C}_d) = \sum_x [\hat{I}_t(\hat{C}_d; x)]^\beta / \left[\sum_x \hat{I}_t(\hat{C}_d; x)\right]^\beta,$$

where the exponent β can be adjusted to tailor performance. Other performance metrics can be employed in the place of generalized sharpness, including but not limited to a likelihood metric or a regularized likelihood metric.

At operation 810, maximize the performance metric by iteratively changing the estimate of the transmission-matrix parameters.

Figure 9A:
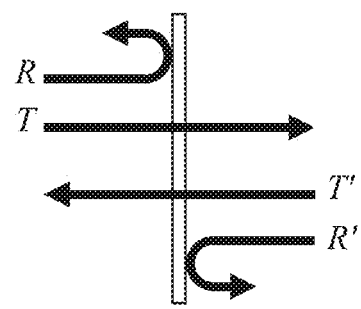
FIG. 9A and FIG. 9B schematically illustrate models for a thin diffuser and a thick diffuser respectively according to some embodiments.

FIG. 9A illustrates a schematic view of the single thin diffuser model used in some example embodiments. The T and T' show light passing through the diffuser, and the R and R' show reflected light, from both directions in each case.

The "scattering matrix" for the thin diffuser is the generalization of the one-way transmission matrix T, and may be represented as, $$S = \begin{pmatrix} R & T' \\ T & R' \end{pmatrix}$$

$$c^{out} = S c^{in}$$

where T is the transmission matrix, R is the reflection matrix, S is the scattering matrix, $c^{out}$ is a vector of output-mode coefficients, and $c^{in}$ is vector of input-mode coefficients.

Figure 9B:
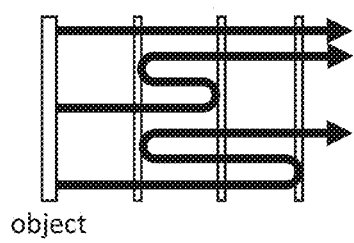

A candidate way to model volume scattering is to utilize a series of thin diffusers distributed along the propagation path. Such a construct can also be used to model reflections off of multiple surfaces in, for example, non-line-of-sight imaging. FIG. 9B illustrates a schematic view of a thick (volume) diffuser comprising three thin diffusers. Although some light from the object passes straight through the thick diffuser without reflection as shown, a substantial portion of the light from the object reflects back and forth between adjacent or even non-adjacent diffusers before exiting the thick diffuser.

We can utilize an equivalent "transfer matrix" formulation to efficiently find the terminal properties of the volume scattering. Whereas the scattering matrix is in terms of inputs and outputs, the transfer matrix is in terms of total fields on the left and right of the scattering media. The "transfer matrix" may be calculated as follows $$c^{right} = M c^{left}$$

where M is the transfer matrix, $c^{right}$ is a vector of right-mode coefficients, and $c^{left}$ is vector of left-mode coefficients. The net transfer matrix, $M_{net}$, associated with a cascade of K thin diffusers is found to be $M_{net} = M_F^{K+1} \Pi_{k=K}^{1} M_d^k M_F^k$, where $M_F^k$ is the transfer matrix for the kth free space, and $M_d^k$ is the transfer matrix for the kth diffuser. It is straight forward to compute the transfer matrix for a single diffuser from its scattering-matrix counterpart. It is also straightforward to compute the free-space transfer matrix for propagation between thin diffusers. The advantage of the transfer matrix formulation is that the terminal properties for an entire thick diffuser, including all of the interactions between thin diffusers, are readily found by taking a product of transfer matrices. Such a model accounts for reflection as well as scattering in both directions and allows for multiple scattering among the multiple thin diffusers.

Figure 10A:
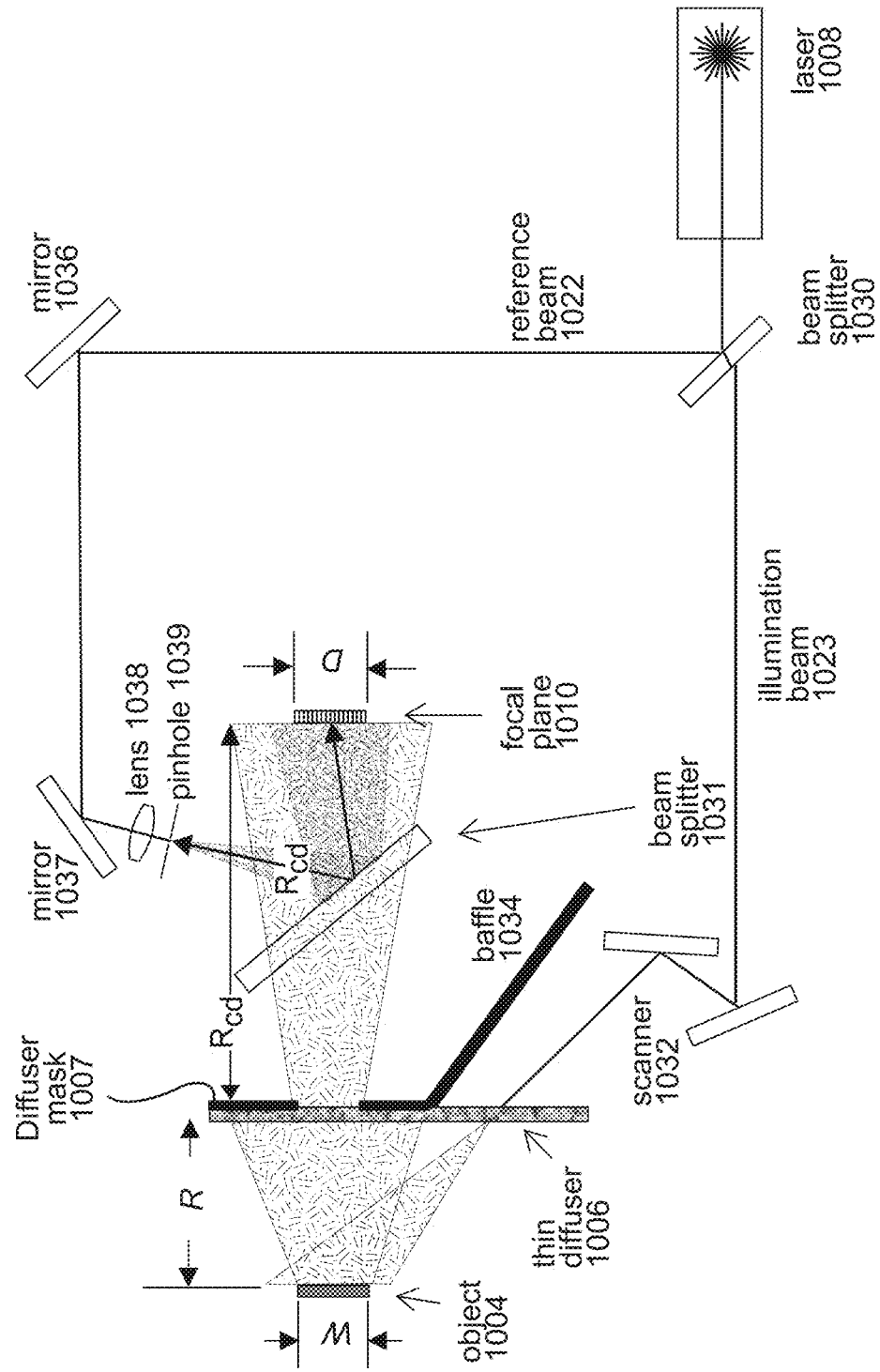
FIG. 10A illustrates an example laboratory arrangement according to some embodiments.

FIG. 10A shows another arrangement 1000 of the components of the system 102 according to an embodiment.

In the arrangement 1000, as with the arrangements described in relation to FIGS. 1 and 4A, the light beam from the light source (laser 1008) is split by a beam splitter 1030 to a reference beam 1022 and an object-illumination beam 1023, and the object-illumination beam is controlled by a scanner 1032 to illuminate the target object 1004 through a scattering medium (thin diffuser 1006). The reference beam, however, in contrast to the arrangements in FIGS. 1 and 4A, is arranged to be reflected by multiple mirrors, at least one lens and a pinhole, and a second beam splitter, 1031, to interfere with the reflected light from the target object at the focal plane, 1010.

In this embodiment too, a processing system connected to a digital sensor array at the focal plane 1010 received the hologram formed by the interference of the light that originated from the object-illumination beam 1023 and the reference beam 1022, and performs processing such as that described in relation to FIGS. 7 and 8 to obtain an image of the target object 1004.

In an example laboratory setup of the arrangement 1000, the extent of the detector array D=13.4 mm, wavelength $\lambda$=532 nm, range to target R=0.265 m, range camera-to-diffuser $R_{cd}$=0.173 m, pinhole diameter $d_{ph}$=25 μm, object width W=5 mm, and with the width of the aperture at the diffuser $W_d$=5.6 mm, as defined by the diffuser mask, 1007. This laboratory design incorporates some of the practical features needed for a real experiment, including a mirror scanner and a spherical reference beam that meets the holographic condition. This design was carefully modelled in simulation and found to work well to demonstrate strictly one-sided imaging through a thin diffuser.

Figure 10B:
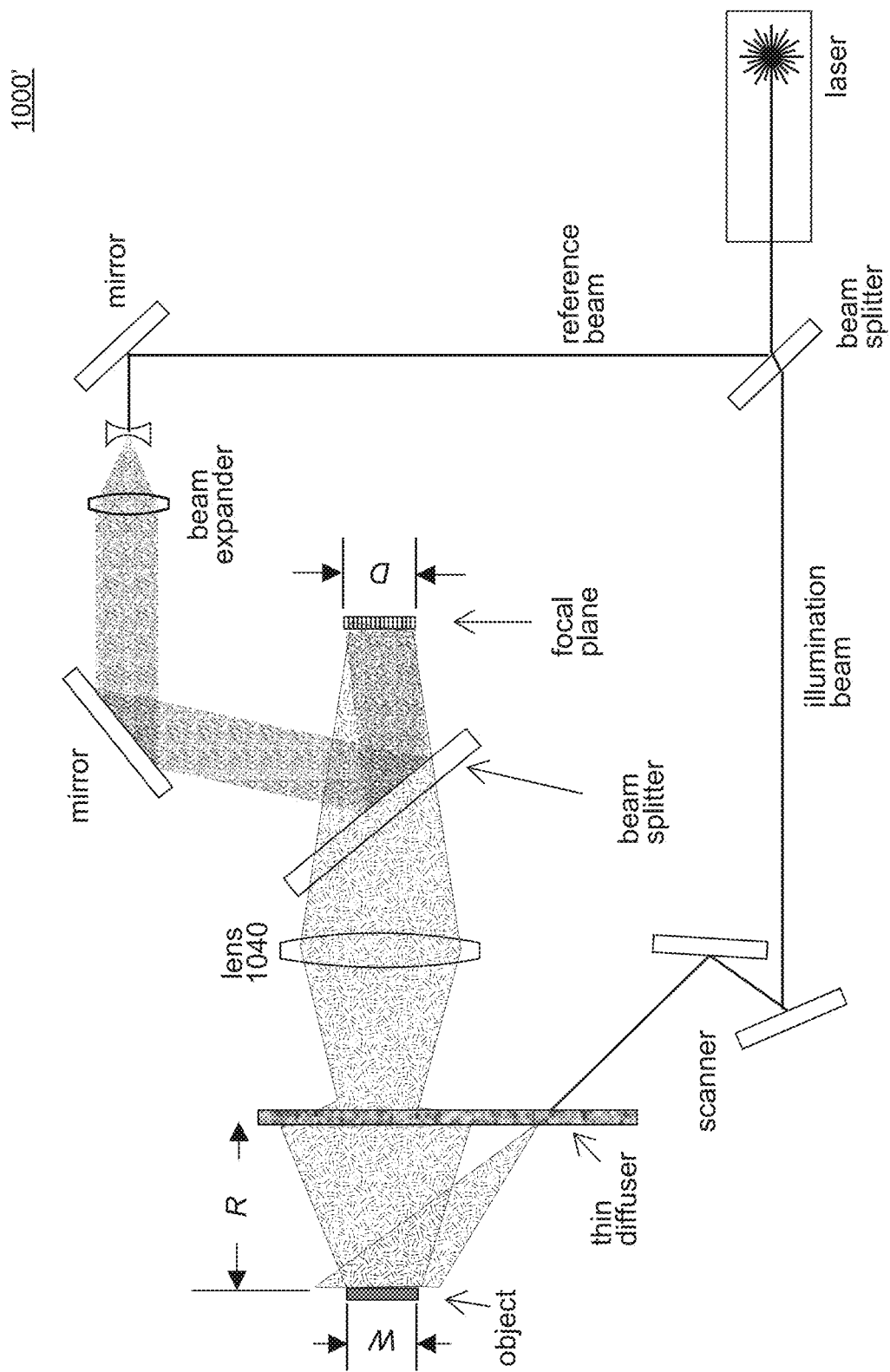
FIG. 10B illustrates an example another example laboratory arrangement according to some embodiments.

FIG. 10B shows yet another example laboratory arrangement 1000' of the system 102 according to an embodiment. The arrangement 1000' is similar to the arrangement 1000, but includes an imaging element, for example, a focusing element such as lens 1040, which allows the capture of a wider angular subtense of light scattered from the diffuser. The imaging element is placed between the diffuser and the detector array. In addition, in this arrangement, the reference beam can be a simple plane wave. According to some embodiments, a mask and/or a baffle similar to the arrangement 1000 may be required in this arrangement.

Figure 11:
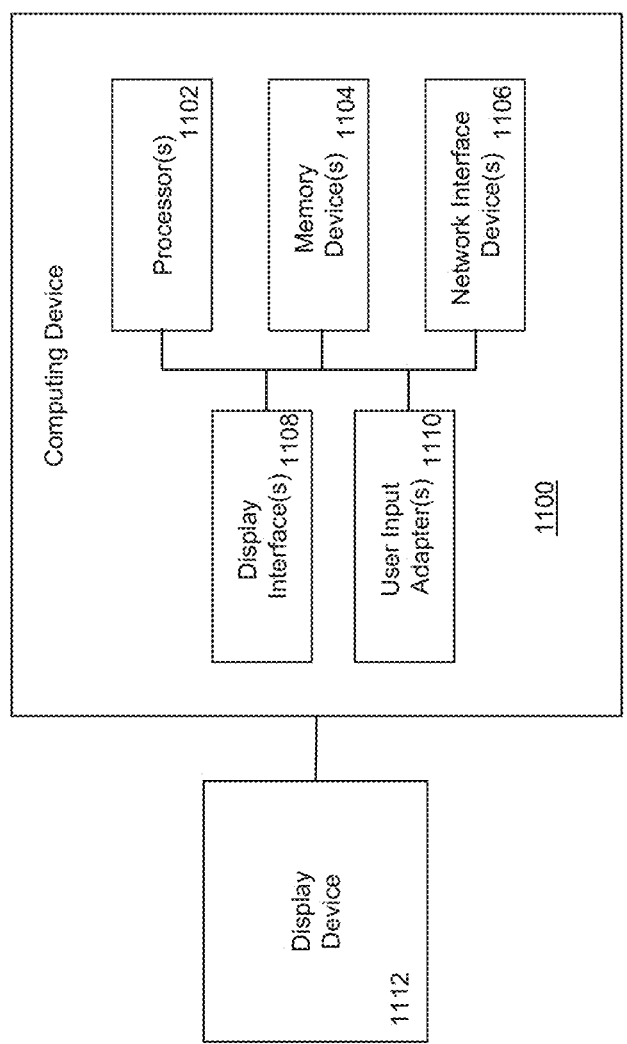
FIG. 11 is a computing device on which some of the embodiments can be implemented.

FIG. 11 schematically illustrates a computer that can be used to implement the processing system such as that described in relation to FIGS. 1, 3, 4A, 4B, 6, 10A, and 10B, according to some example embodiments. The computer shown in FIG. 11 may run the processes described in relation to FIGS. 7, 8 and other figures. FIG. 11 is a block diagram of an example computing device 1100 (which may also be referred to, for example, as a "computing device," "computer system," or "computing system") according to some embodiments. In some embodiments, the computing device 1100 includes one or more of the following: one or more processors 1102; one or more memory devices 1104; one or more network interface devices 1106; one or more display interfaces 1108; and one or more user input adapters 1110.

Additionally, in some embodiments, the computing device 1100 is connected to or includes a display device 1112. As will be explained below, these elements (e.g., the processors 1102, memory devices 1104, network interface devices 1106, display interfaces 1108, user input adapters 1110, display device 1112) are hardware devices (for example, electronic circuits or combinations of circuits) that are configured to perform various different functions for the computing device 1100.

In some embodiments, each or any of the processors 1102 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like).

In some embodiments, each or any of the memory devices 1104 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1102). Memory devices 1104 are examples of non-volatile computer-readable storage media.

In some embodiments, each or any of the network interface devices 1106 includes one or more circuits (such as a baseband processor and/or a wired or wireless transceiver), and implements layer one, layer two, and/or higher layers for one or more wired communications technologies and/or wireless communications technologies.

In some embodiments, each or any of the display interfaces 1108 is or includes one or more circuits that receive data from the processors 1102, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1112, which displays the image data. Alternatively or additionally, in some embodiments, each or any of the display interfaces 1108 is or includes, for example, a video card, video adapter, or graphics processing unit (GPU).

In some embodiments, each or any of the user input adapters 1110 is or includes one or more circuits that receive and process user input data from one or more user input devices that are included in, attached to, or otherwise in communication with the computing device 1100, and that output data based on the received input data to the processors 1102. Alternatively or additionally, in some embodiments each or any of the user input adapters 1110 is or includes, for example, a PS/2 interface, a USB interface, a touchscreen controller, or the like; and/or the user input adapters 1110 facilitates input from user input devices such as, for example, a keyboard, mouse, trackpad, touchscreen, etc.

In some embodiments, the display device 1112 may be a Liquid Crystal Display (LCD) display, Light Emitting Diode (LED) display, or other type of display device. In embodiments where the display device 1112 is a component of the computing device 1100 (e.g., the computing device and the display device are included in a unified housing), the display device 1112 may be a touchscreen display or non-touchscreen display. In embodiments where the display device 1112 is connected to the computing device 1100 (e.g., is external to the computing device 1100 and communicates with the computing device 1100 via a wire and/or via wireless communication technology), the display device 1112 is, for example, an external monitor, projector, television, display screen, etc.

In various embodiments, the computing device 1100 includes one, or two, or three, four, or more of each or any of the above-mentioned elements (e.g., the processors 1102, memory devices 1104, network interface devices 1106, display interfaces 1108, and user input adapters 1110). Alternatively or additionally, in some embodiments, the computing device 1100 includes one or more of: a processing system that includes the processors 1102; a memory or storage system that includes the memory devices 1104; and a network interface system that includes the network interface devices 1106.

As previously noted, whenever it is described in this document that a software module or software process performs any action, the action is in actuality performed by underlying hardware elements according to the instructions that comprise the software module.

The hardware configurations shown in FIG. 11 and described above are provided as examples, and the subject matter described herein may be utilized in conjunction with a variety of different hardware architectures and elements.

As described above, some embodiments enable a practical way for acquiring images of satisfactory quality through/off scattering media. Respective example embodiments can be used, for example, in remote-sensing applications impeded by intervening scattering media such as, for example, clouds, fog, smoke, aerosols, tree canopies, material covering targets (for example tents or tarps), in biological-imaging applications to scan through biological tissue, in non-line-of-sight imaging applications, and in applications that improve reception for signals in the presence of multipath effects. Another application is to use the estimate of the scattering media to focus energy onto a target (such as, for example, a biological tumor for clinical treatment).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An imaging system, comprising:
a laser source;
a digital sensor array;
a processing system including at least one processor, the processing system being configured to perform operations comprising:
transmitting light from the laser source to a target object;
detecting interference formed on the digital sensor array by a reference beam from the transmitted light and reflected light from the target object, the reflected light either travelling through or being reflected by a scattering medium located between the target object and the digital sensor array;
jointly estimating, based on the detected interference, the scattering medium and an image of the target object; and
outputting the jointly estimated image of the target object,
wherein the jointly estimating includes:
determining an intermediate estimate of a transmission matrix of at least one diffuser corresponding to the scattering medium;
for each of a plurality of speckle realizations, inverse propagating wave fields detected at the digital sensor array, back to the estimated diffuser, through the estimated diffuser, and back to a location of the target object;
determining an intermediate estimate of an incoherent object by speckle averaging at a plane of the target object;
determining a performance metric of the estimated incoherent object; and
maximizing the performance metric by iteratively changing the estimate of the transmission matrix.

2. The imaging system according to claim 1, wherein the reflected light from the target object travels through the scattering medium, and wherein the scattering medium includes at least one of clouds, fog, smoke, human tissue, murky water, or dense tree canopy.

3. The imaging system according to claim 1, wherein the reflected light from the target object is reflected by the scattering medium, and wherein the scattering medium includes a door, or a wall.

4. The imaging system according to claim 1, wherein the detecting is based on digital holography.

5. The imaging system according to claim 4, wherein the detecting is further based on detecting, at the digital sensor array, holographic fringe patterns at a wavelength of the laser source.

6. The imaging system according to claim 5, wherein the processing system is further configured to control a pixel pitch of the digital sensor array to be sufficiently fine to resolve the holographic fringe patterns.

7. The imaging system according to claim 1, wherein the jointly estimating includes estimating the image of the target object that would be reconstructed if there were no scattering present between the target object and the digital sensor array.

8. The imaging system according to claim 1, wherein the inverse propagating is performed for each of a plurality of speckle realizations, and wherein the intermediate estimate of the incoherent object is determined by speckle averaging over the plurality of speckle realizations at the plane of the target object.

9. The imaging system according to claim 8, wherein the plurality of speckle realizations is obtained by changing illumination direction of the target object.

10. The imaging system according to claim 1, wherein the performance metric is a sharpness metric.

11. The imaging system according to claim 10, wherein the sharpness metric is determined by raising a value of each pixel to a power and then summing over all pixels.

12. The imaging system according to claim 1, wherein the performance metric is based on an estimation-theoretic algorithm.

13. The imaging system according to claim 12, wherein the estimation-theoretic algorithm is a Maximum-Likelihood (ML) or a Maximum a Posteriori (MAP) algorithm.

14. The imaging system according to claim 1, wherein the transmission matrix is generalized to a scattering matrix corresponding to a distribution of thin diffusers.

15. The imaging system according to claim 1, wherein the reflected light includes light scattered by the scattering medium.

16. The imaging system according to claim 15, wherein the reflected light further includes unscattered light.

17. The imaging system according to claim 1, wherein the laser source is a Continuous Wave (CW) laser source, a pulsed laser source, a visible laser, a laser whose wavelength is outside of the visible range, or a maser.

18. The imaging system according to claim 17, wherein the processing system is configured to control a wavelength of the laser source in accordance with a type of the scattering medium, a type of the target object, and/or an estimated distance between the target object and the scattering medium.

19. The imaging system according to claim 18, wherein the processing system is configured to control the wavelength in accordance with the target object such that a surface of the target object is rough relative to the wavelength of coherent light by which it will be illuminated.

20. The imaging system according to claim 1, further comprising a lens, wherein the reflected light further travels through an imaging element located between the scattering medium and the digital sensor array.

21. The imaging system according to claim 1, wherein the laser source comprises a tunable laser, wherein the operation further comprise controlling the tunable laser to obtain 3D shape information of the target object.

22. The imaging system according to claim 1, wherein the processing system is further configured to control a device to focus energy to the target object in accordance with the jointly estimated scattering medium.

23. An imaging method performed by a processing system including at least one processor, comprising:
   controlling a laser light source to transmit light to a target object;
   detecting interference formed on a digital sensor array by a reference beam from the transmitted light and reflected light from the target object, the reflected light either travelling through or being reflected by a scattering medium located between the target object and the digital sensor array;
   jointly estimating, based on the detected interference, at least one parameter defining the scattering behavior of the scattering medium and an image of the target object; and
   outputting the jointly estimated scattering parameter and an image of the target object,
   wherein the jointly estimating includes:
      determining an intermediate estimate of a transmission matrix of at least one diffuser corresponding to the scattering medium;
      for each of a plurality of speckle realizations, inverse propagating wave fields detected at the digital sensor array, back to the estimated diffuser, through the estimated diffuser, and back to a location of the target object;
      determining an intermediate estimate of an incoherent object by speckle averaging at a plane of the target object;
      determining a performance metric of the estimated incoherent object; and
      maximizing the performance metric by iteratively changing the estimate of the transmission matrix.

24. A non-transitory computer readable storage medium storing instructions which, when executed by a processing system including at least one processor, causes the processing system to perform:
   controlling a laser light source to transmit light to a target object;
   detecting interference formed on a digital sensor array by a reference beam from the transmitted light and reflected light from the target object, the reflected light either travelling through or being reflected by a scattering medium located between the target object and the digital sensor array;
   jointly estimating, based on the detected interference, at least one parameter defining the scattering behavior of the particular scattering medium and an image of the target object; and
   outputting the jointly estimated scattering parameter and an image of the target object,
   wherein the jointly estimating includes:
      determining an intermediate estimate of a transmission matrix of at least one diffuser corresponding to the scattering medium;
      for each of a plurality of speckle realizations, inverse propagating wave fields detected at the digital sensor array, back to the estimated diffuser, through the estimated diffuser, and back to a location of the target object;
      determining an intermediate estimate of an incoherent object by speckle averaging at a plane of the target object;
      determining a performance metric of the estimated incoherent object; and
      maximizing the performance metric by iteratively changing the estimate of the transmission matrix.

\* \* \* \* \*

UNITED STATES PATENT AND TRADEMARK OFFICE
CERTIFICATE OF CORRECTION

| | |
|---|---|
| PATENT NO. | : 11,835,923 B2 |
| APPLICATION NO. | : 17/092181 |
| DATED | : December 5, 2023 |
| INVENTOR(S) | : Richard G. Paxman et al. |

It is certified that error appears in the above-identified patent and that said Letters Patent is hereby corrected as shown below:

In the Specification

Column 11, Line 32 should read "$\mathcal{F}_{td}\{\cdot\}$"

Column 11, Line 66 should read "the asterisk represents complex conjugate, and $\epsilon$ is a small number"

Column 12, Lines 63-64 should read "$M_{net} = M_F^{K+1} \prod_{k=K}^{1} M_d^k M_F^k$, where $M_F^k$"

Signed and Sealed this
Twenty-first Day of May, 2024

Katherine Kelly Vidal
*Director of the United States Patent and Trademark Office*